(12) United States Patent
Borton

(10) Patent No.: US 10,875,608 B2
(45) Date of Patent: Dec. 29, 2020

(54) SOLAR POWERED BOAT

(71) Applicant: David Newbold Borton, Troy, NY (US)

(72) Inventor: David Newbold Borton, Troy, NY (US)

(73) Assignee: David N. Borton, Troy, NY (US)

( * ) Notice: Subject to any disclaimer, the term of this patent is extended or adjusted under 35 U.S.C. 154(b) by 70 days.

(21) Appl. No.: 15/525,192

(22) PCT Filed: Nov. 10, 2015

(86) PCT No.: PCT/US2015/059967
§ 371 (c)(1),
(2) Date: May 8, 2017

(87) PCT Pub. No.: WO2016/077357
PCT Pub. Date: May 19, 2016

(65) Prior Publication Data
US 2018/0281902 A1  Oct. 4, 2018

Related U.S. Application Data

(60) Provisional application No. 62/077,353, filed on Nov. 10, 2014.

(51) Int. Cl.
*B63H 21/17* (2006.01)
*B63B 17/02* (2006.01)
(Continued)

(52) U.S. Cl.
CPC .............. *B63B 17/02* (2013.01); *B60L 8/003* (2013.01); *B63B 5/12* (2013.01); *B63H 21/17* (2013.01);
(Continued)

(58) Field of Classification Search
CPC ................ B63B 17/02; B63B 2017/02; B63B 2017/026; B63B 2209/18; B63B 2755/00;
(Continued)

(56) References Cited

U.S. PATENT DOCUMENTS 5,086,725 A * 2/1992 Garrett ...................... B63B 3/04
114/271
5,129,343 A   7/1992 Giles
(Continued)

FOREIGN PATENT DOCUMENTS

DE       29714777 U1    11/1997

OTHER PUBLICATIONS

The International Preliminary Report on Patentability (PCT/IB/373) dated May 16, 2017, with a the Written Opinion of the International Searching Authority(PCT/ISA/237), completed on Dec. 31, 2015.
(Continued)

*Primary Examiner* — Daniel V Venne
(74) *Attorney, Agent, or Firm* — Heslin Rothenberg Farley & Mesiti P.C.; Victor A. Cardona, Esq.

(57) ABSTRACT

A solar powered aquatic vessel includes a hull having an overall length equal to a length of a waterline and a maximum hull draft at station that is located at a position that is approximately 30% of the overall length of the hull. A bottom of the hull has an approximately linear slope from a maximum beam to a transom forming a stern of the hull. A canopy is connected to the hull of the solar powered aquatic vessel and supports at least one photovoltaic panel connected to a photovoltaic system positioned in the hull. The photovoltaic system generates electrical power from a sun that is equal to or greater than an electrical power necessary to propel the solar powered vehicle, and a motor operatively connected to the photovoltaic system.

18 Claims, 13 Drawing Sheets

(51) Int. Cl.
*B63B 5/12* (2006.01)
*H02S 10/40* (2014.01)
*H02S 30/20* (2014.01)
*H02S 40/38* (2014.01)
*B60L 8/00* (2006.01)
*H02K 5/132* (2006.01)
*H02K 7/14* (2006.01)
*H02K 11/00* (2016.01)

(52) U.S. Cl.
CPC ............... *H02K 5/132* (2013.01); *H02K 7/14* (2013.01); *H02K 11/0094* (2013.01); *H02S 10/40* (2014.12); *H02S 30/20* (2014.12); *H02S 40/38* (2014.12); *B60L 2200/32* (2013.01); *B63B 2017/026* (2013.01); *B63B 2209/18* (2013.01); *B63H 2021/171* (2013.01); *Y02T 10/7072* (2013.01); *Y02T 70/5236* (2013.01)

(58) Field of Classification Search
CPC ... B63H 21/17; B63H 2021/171; H02S 30/20; H02S 40/38; H02K 7/14; H02K 11/0094; H02K 5/132; B60L 8/003; B60L 2200/32
USPC ..................................... 114/361, 364; 440/6
See application file for complete search history.

(56) References Cited

U.S. PATENT DOCUMENTS

| | | | | |
|---|---|---|---|---|
| 5,676,087 | A * | 10/1997 | Baker | .................... B63B 1/042 |
| | | | | 114/283 |
| 6,672,240 | B1 * | 1/2004 | Aube | ..................... B63B 19/14 |
| | | | | 114/343 |
| 6,855,016 | B1 * | 2/2005 | Jansen | ................... B63H 16/14 |
| | | | | 440/27 |
| 7,047,902 | B1 | 5/2006 | Little | |
| 9,090,321 | B1 | 7/2015 | Casperson | |
| 9,919,784 | B1 * | 3/2018 | Fisher | .................... B63H 21/17 |
| 2009/0114264 | A1 | 5/2009 | Giampietro et al. | |
| 2009/0145346 | A1 | 6/2009 | Burroughs | |

OTHER PUBLICATIONS

Notification of Transmittal of the International Search Report and the Written Opinion of the International Searching Authority, or the Declaration (PCT/ISA/220), with the International Search Report (PCT/ISA/210) and the Written Opinion (PCT/ISA/237), completed on Dec. 31, 2015, and dated Jan. 21, 2016.
http://www.wolfeboats.com/design.php—"Harmony 25 Electric Launch", Nov. 6, 2015.
Neston Farmer, "Coyote II", 1975.
The extended European Search Report, PCT/US2015059967, dated Nov. 19, 2018.

* cited by examiner

SOLAR POWERED BOAT

CROSS-REFERENCE TO RELATED APPLICATIONS

This application is a 371 National Phase of PCT International Application No. PCT/US2015/059967 filed Nov. 10, 2015, published as WO 2016/077357 A1 on May 19, 2016, which claims priority to U.S. Provisional Application No. 62/077,353 filed Nov. 10, 2014, the entire disclosures of which are incorporated herein by reference.

FIELD OF THE TECHNOLOGY

The following relates generally to high efficiency solar powered vehicles and, more specifically, relates to embodiments of solar powered boats, yachts or other aquatic vessels.

BACKGROUND

Individuals are aware of and constantly reminded of the steady decrease in the world wide supply of non-renewable resources such as oil, coal and natural gas. In many countries, including the United States, new and exciting research is being performed to identify ways to increase vehicle fuel efficiency. In recent years, electric, hybrid and hydrogen powered vehicles have become more common place to help achieve and meet the United States' energy goals in achieving energy independence. Alternate sources of energy have been investigated and implemented with varying ranges of success, as a means for reducing pollutant levels in large cities, across the country, including wind, solar, geothermal, and hydroelectric power.

Vehicles such as cars, trucks, boats and recreational vehicles, contribute to a major portion of non-reusable energy consumption. At the present time, this excessive fuel consumption contributes to the pollution emitted from the use of oil derived fuels, such as gasoline and diesel fuel which powers today's vehicles. Electrically powered vehicles can be beneficial because they do not produce the fumes, exhaust and pollution that a gasoline or diesel powered vehicle would produce. However, electric powered vehicles typically have limitations on travel distance. In electric powered vehicles, a series of storage batteries are mounted within the vehicle in an effort to provide the electricity needed to energize an electric motor connected to the drive train of the vehicle. A large number of storage batteries are typically employed to provide sufficient electricity to propel the vehicle over a wide range before requiring recharging. Despite rigorous efforts to create a suitable electrically powered vehicle, many of the resulting vehicles have a very limited length of use or distance that can be traveled, before having to find a charging station or the user has to return back to their home to resupply the vehicle with power. Such a charging period can be extensive and prevent the vehicle from being used for an extended length of time, typically several hours to fully charge the vehicle.

To overcome the problems with limited electrical supplies in vehicles and the necessity for connecting the batteries in an electric powered vehicle to a source of electricity for recharging, solar panels have been mounted on vehicles to partially recharge the batteries during the operation of the vehicle so as to increase the operating range of the vehicle and to decrease battery recharging time. These attempts have been met with limited success since previously devised solar panels provide only minimal recharging capacity due to the small amount of external space available on vehicles for mounting the panels and the vehicles draining the onboard batteries faster than the energy can be supplied.

Thus, it would also be desirable to provide an electric powered vehicle in which solar radiation is utilized to generate the electricity needed to power the vehicle, wherein the amount of solar radiation being absorbed and converted to electrical energy is equal to or exceeds the rate of electrical energy consumption by the vehicle. It would thus be desirable to provide an electric powered vehicle in which a solar collector having a large surface area may be mounted on the vehicle to extend the driving range of the vehicle and decrease or eliminate the battery recharging time.

SUMMARY

A first embodiment of this disclosure relates generally to a solar powered aquatic vessel comprising a hull having an overall length equal to a length of a waterline, a maximum hull draft at approximately 30% of the overall length of the hull, a bottom of the hull, the bottom having an approximately linear slope from a maximum beam to a transom forming a stern of the hull, a canopy connected to the hull of the aquatic vehicle, supporting at least one photovoltaic panel connected to a photovoltaic system positioned in the hull, the photovoltaic system generating electrical power from a sun that is equal to or greater than the electrical power necessary to propel the solar powered vehicle and a motor operatively connected to the photovoltaic system and connected to a propeller to cause movement of the hull.

A second embodiment of this disclosure relates generally to a method for powering an aquatic vehicle comprising the steps of providing a hull having an overall length equal to a length of a waterline, a maximum hull draft at station located at a position that is approximately 30% of the overall length of the hull and a bottom of the hull, the bottom having an approximately linear slope from a maximum beam to a transom forming a stern of the hull, connecting a canopy to the hull, providing a photovoltaic system having at least one solar cell, attaching a motor operatively connected to the photovoltaic system to the hull, positioning the solar cell on a top surface of the canopy and generating electrical power from a sun that is equal to or greater than the electrical power necessary for the motor to propel the solar aquatic vehicle. The vessel is operated at about a half a hull speed to promote efficient operation.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Certain embodiments are described in detail below. Terms used herein may be defined as follows:

"Aft" may refer to an adjective or adverb meaning towards the rear of the vessel, particularly when the frame of reference is within the vessel.

"Beam" may refer to the maximum width of the vessel at any location along its length.

"Bow" may refer to the forward portion of the hull of the vessel.

"Chine" may refer to a hard division between two surfaces located below the "sheer line", which may refer to the defined curve that forms a junction between the deck and the hull.

"Depth" may refer to an approximate distance between a bottom of the hull to the highest point of the sheer line.

"Draft" may refer to a vessel's hull and the vertical distance between the waterline and the bottom of the hull (sometimes called the "keel").

"Fairing" may refer to a process of manipulating the hull shape to create a smooth surface for construction. Fairing may be an external structure used to increase streamlining and reduce drag.

"Hull" may refer to the main portion of a vessel, and may include the deck, the sides and the bottom of the vessel.

"Hull speed" or "displacement speed" may refer to the speed at which a free surface wave is equal to the wavelength of the boat's waterline length. Hull speed in knots may be defined as 1.3 times the square root of the water line length in feet or 2.43 time the waterline length in meters.

"Photovoltaic" may refer to utilizing or relating to the generation of a voltage from light or electromagnetic radiation into direct current.

"Station" may refer to specific cross-sectional points of the vessel design which may serve as points of reference and measurement during the construction of the vessel.

"Transom" may refer to a surface of a vessel that forms the stern of the vessel. A transom may have a variety of different shapes, including flat, curved, raked forward, raked aft.

"Water line" may refer to the point on the hull that corresponds to the water's surface when the vessel is afloat on an even keel.

Figure 1:
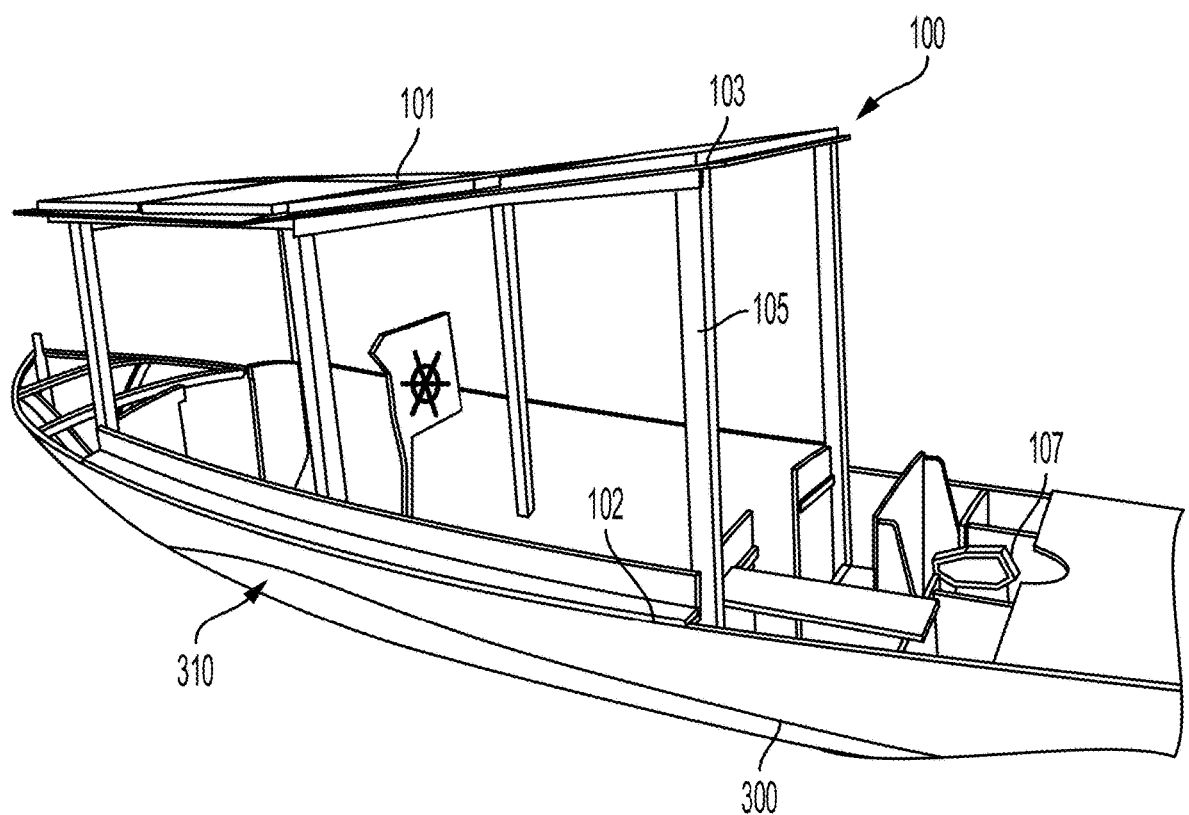
FIG. 1 depicts an isometric view of an embodiment of a solar powered aquatic vessel.

Referring now to the drawings, FIG. 1 depicts an embodiment of a solar powered aquatic vessel 100, such as a boat or ship. In an exemplary embodiment, the solar powered aquatic vessel may be a launch boat. Alternative embodiments of boats that may be suitable for use as an aquatic vessel 100 may include a bass boat, bay boat, bowrider, center console boat, convertible fishing boat, cruiser, cuddy cabin, deck boat, dingy, downeast cruiser, dual console, express fisherman, fish 'n ski boat, flats boat, high performance boat, inflatable boat, jet boat, Jon boat, multi species boat, pilothouse boat, pontoon, powered catamaran, rigid inflatable, runabout, sedan bridge boat, ski and wakeboard boat, skiff, utility boat, walkaround boat, trawler, or any other known boating type.

Embodiments of a solar powered aquatic boat or vessel 100 may include a hull 102, which may be a displacement hull, for example. The hull 102 may form the main portion of a ship or boat. In some embodiments, the hull may be constructed or used to house and/or attach each of the components of the solar powered vessel 100, including a motor 107, a canopy 103, a canopy supports 105, and a photovoltaic system 400a, 400b, 500, including one or more photovoltaic panels 101. Embodiments of hull 102 may be constructed out of numerous types of materials and combinations of materials. Materials suitable for fabricating the hull of boat 100 may include wood, glass reinforced plastic (GRP) such as fiberglass, steel, marine grade plywood, or aluminum constructions may be used as the main building material for constructing the hull.

In some embodiments, hull 102 may be constructed out of a combination of materials. For example, embodiments of the hull may be constructed from a combination of wood and epoxy. In an alternative embodiment, a wood-core may be sandwiched between two layers of fiberglass saturated with an epoxy. In the exemplary embodiment, boat 100 may be constructed out of a combination of wood planking and a fiberglass coating epoxied to the exterior surface of the wood layer of boat 100. In yet another alternative embodiment, hull 102 may be constructed out of a wood core having fiberglass constructing the interior of hull 102 and having an outer surface of the hull being constructed from fiberglass and a synthetic composite fiber made from reinforced plastic. The reinforced plastic may be an acrylic resin constructed out of a copolymer of acrylonitrile and vinyl chloride (trade name Dynel™).

In some embodiments, hull 102 of boat 100 may be constructed using a ladder frame or a hard back form as a template for building the solar powered boat 100. When constructing an embodiment of hull 102 using a ladder frame technique, each cross section of the hull's frame, upon which the strips of wood, fiberglass or other construction materials may be laid, may be referred to as a "station." Each station of the hull's frame may be assigned a reference number based on the number of cross sections away from the bow of vessel 100 that the referenced cross section may reside.

Figure 2:
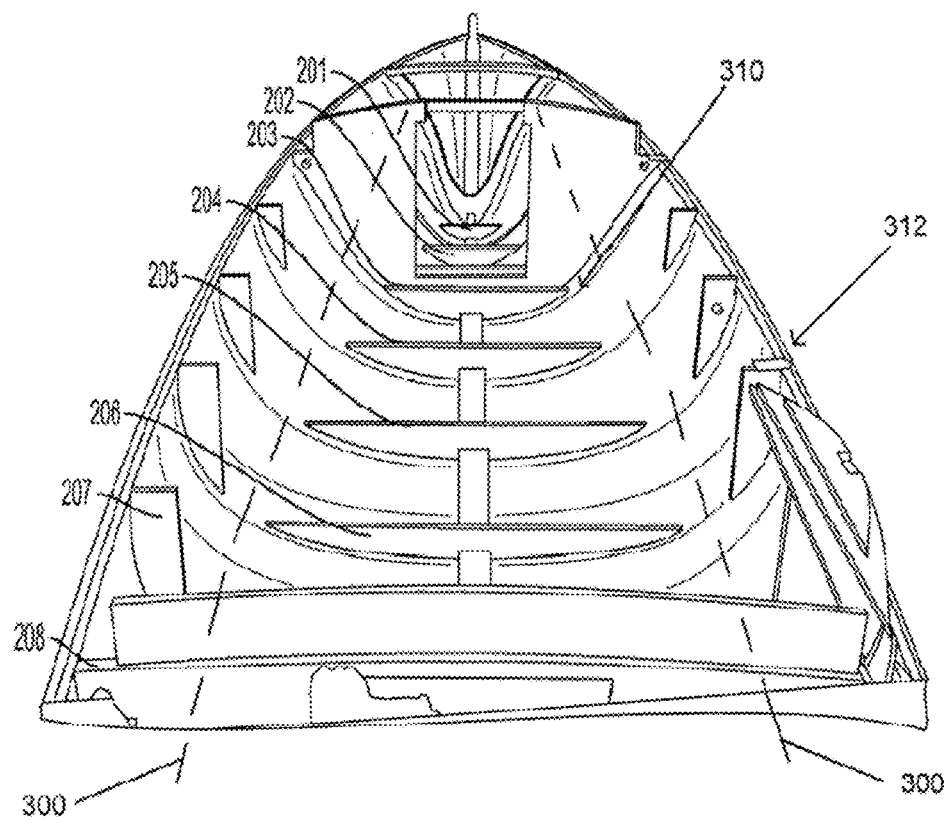
FIG. 2 depicts a top perspective view of an embodiment of a hull for a solar powered aquatic vessel.

Referring to the drawings, FIG. 2 displays a top perspective view depicting the interior of the hull while under construction. In the embodiment depicted in the drawings, eight of stations 201, 202, 203, 204, 205, 206, 207 and 208 are visible. The number of stations 201, 202, 203, 204, 205, 206, 207 and 208 may vary depending on the length of the vessel being constructed and the distance between each of the cross sections in the ladder frame template. In some embodiments, the vessel may include between 2-20 stations, while in other embodiments there may be less than 20 stations, less than 15 stations, less than 10 stations or less than 5 stations. In an exemplary embodiment, the hull may be constructed out of 10 stations, including stations 201, 202, 203, 204, 205, 206, 207 and 208, plus one additional station not pictured, and the transom 305 of the vessel 100, forming the vessel's stern.

The length of the beams from sheer to sheer of each station may vary from embodiment to embodiment. Embodiments having a longer total hull length L may include stations having longer beams forming the cross sections at each station, whereas a vessel having a smaller hull length L, may have shorter beams forming the cross sections of the hull 102 at each of the stations. In the exemplary embodiment, the maximum beam length may be positioned at approximately fifth station 205. The beam length at each of the stations forming the cross sections of the hull may be between approximately 1-15 ft, 3-12 ft, or 5-10 ft in length. For example, in an embodiment having a maximum hull length L of approximately 25 ft, the maximum beam length may be approximately 7 ft. The remaining beams constructing the hull of this embodiment may be less than or equal to 7 ft in length. In an alternative embodiment, wherein the length of the hull L is approximately 40 ft in length, the maximum beam length may be approximately 11 ft. The remaining lengths of the beams positioned at each station may be less than 11 ft in length.

Figure 3:
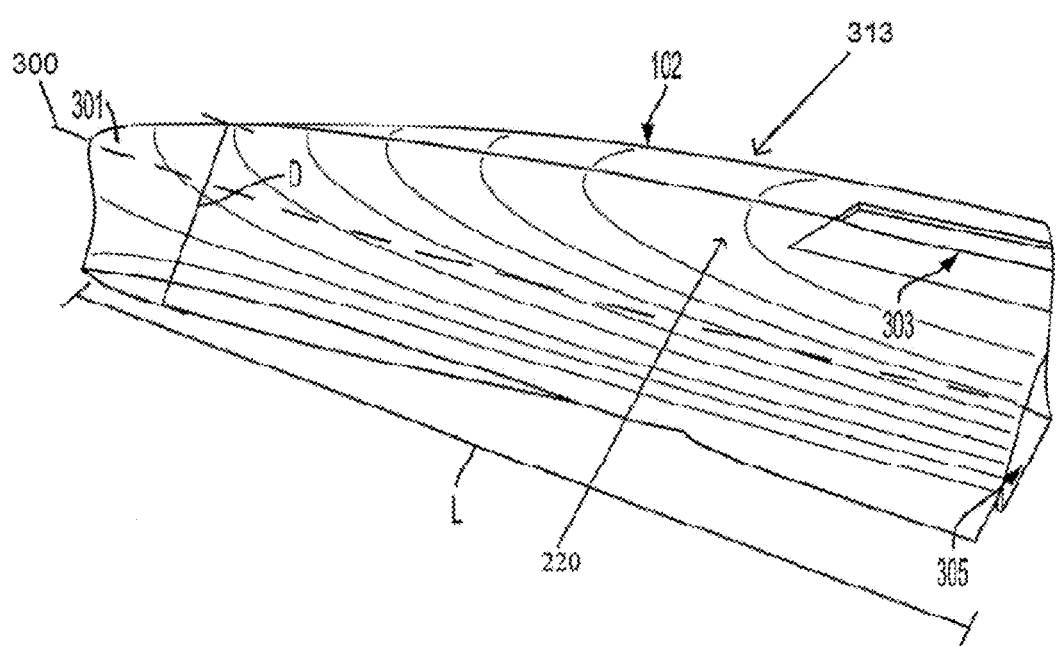
FIG. 3 depicts an isometric bottom view of an embodiment of a hull for a solar powered aquatic vessel.

The efficiency of the hull's 102 construction may reduce the electrical energy requirements needed to propel the solar powered boat 100. To avoid running out of electrical energy needed to power the boat, the hull 102 may be constructed in such an efficient manner that the electrical energy supplied to the boat 100 is equal to or greater than the energy needed to propel the boat 100. In some embodiments, the hull 102 may be constructed such that the overall length of the hull, L is equal to the length of the waterline. For example, in one exemplary embodiment, the length of the hull and the waterline may be approximately 25 ft long. In an alternative exemplary embodiment, the length of the hull may match the length of the waterline having a length of approximately 40 feet. FIGS. 1-3 depict an example of a waterline 300 as described herein with FIGS. 2-3 showing such waterline in phantom.

Another property of the hull 102 that may increase the overall efficiency of the vessel, thus reducing the electrical energy requirements to propel the vessel, may be the shape of the bow and the chine 301 of the hull 102. The bow may be designed to reduce the resistance of the hull 102 when the vessel 100 is in motion, cutting through the water. A faster moving vessel that cuts through the water more quickly may be equipped with a narrow, more tapered bow, whereas a slower moving vessel may be equipped with a fuller or broader shaped bow that maximizes the volume of the ship, based on the ship's length. In an exemplary embodiment, the vessel 100 may be equipped with a V-shaped bow, designed for cutting through the water more efficiently. Alternative embodiments of the solar powered vessel 100 may be equipped with a straight bow, conventional clipper bow, reverse sheer bow, low-cain spoon bow or a high-cain spoon bow.

The angle of the vessel's hull 102 may also contribute to the overall efficiency of the vessel 100 to navigate through open water and affect the amount of energy required to propel the vessel. The angle of the vessel's hull may be referred to as a vessel's chine, e.g., chine 301 depicted in FIG. 3. A chine may be more angular, which may be referred to as a hard chine or the shape may be more rounded, which may be referred to as a soft chine. An example of a hard shine may include S-bottom hulls or a V-shape having two flat panels joined at the keel. Exemplary embodiments of the vessel depicted in FIGS. 1-3 employ the use of a soft chine hull having a more rounded shaped. Soft chine 301 may have a shallow v-shape at the bottom of the nearly vertical, slowly tapering inward side panels of the vessel.

Embodiments of the hull 102 may further include additional construction features that may improve the vessel's overall efficiency and reduction of energy requirements in order to place the vessel in motion. In some embodiments, the shape of the hull 102 may be constructed in a manner that provides a maximum hull draft 310 at approximately third station 203 of the vessel. In the exemplary embodiment, the third station 203 may be located at a position that is 30% of the distance of the hull's length L, measured from the bow of the vessel. In other embodiments of the hull 102, a bottom 313 of the hull may be constructed in such a manner that the aft of the hull 102, at or around the fifth station 205 (e.g., at a maximum beam length 312) a flattened portion 220 may have a flat or a more flattened shape than the shape of the hull at the stations preceding the fifth station 205 (i.e., the portion of the hull closer to the bow than the stern). In some embodiments, the aft of the hull's bottom portion, at or around the fifth station 205 (e.g., at a maximum beam length), flattened portion 220 may be linear in slope between fifth station 105 and transom 305. In other embodiments, the bottom portion of the transom may be positioned at or near the water line. Each of these hull 102 configurations alone or in combination with each other may allow the vessel 100 to navigate the water more efficiently and with less resistance imposed by the water. Accordingly, as the resistance of the water decreases, less energy is required to propel the vessel through the water, thus decreasing the electricity production requirements necessary to be produced by the photovoltaic system 400a, 400b, 500.

Figure 8:
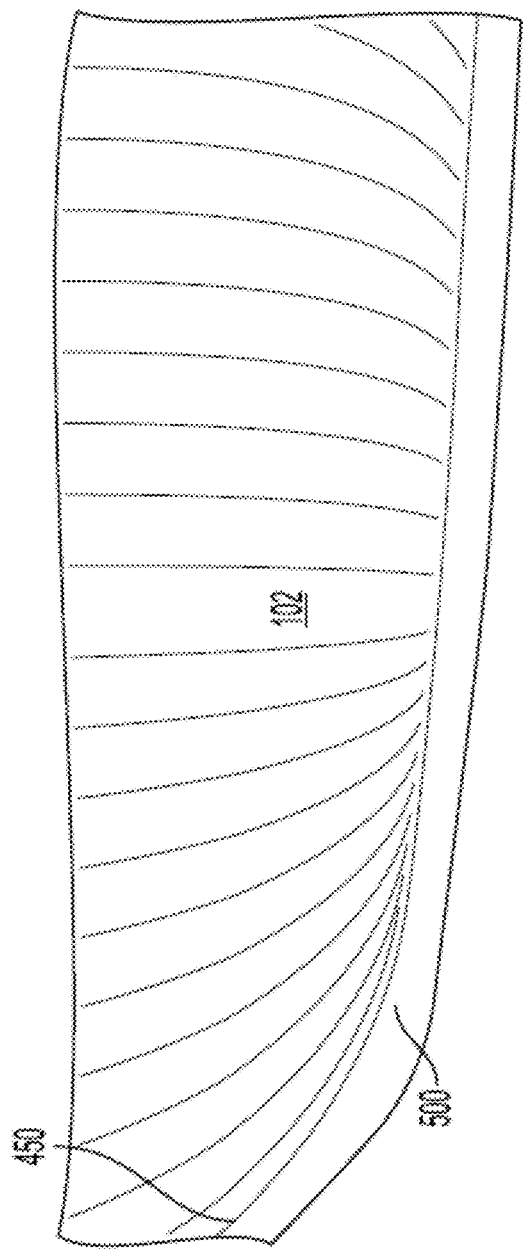
FIG. 8 depicts a bottom perspective view of the vessel of FIG. 7.
Figure 9:
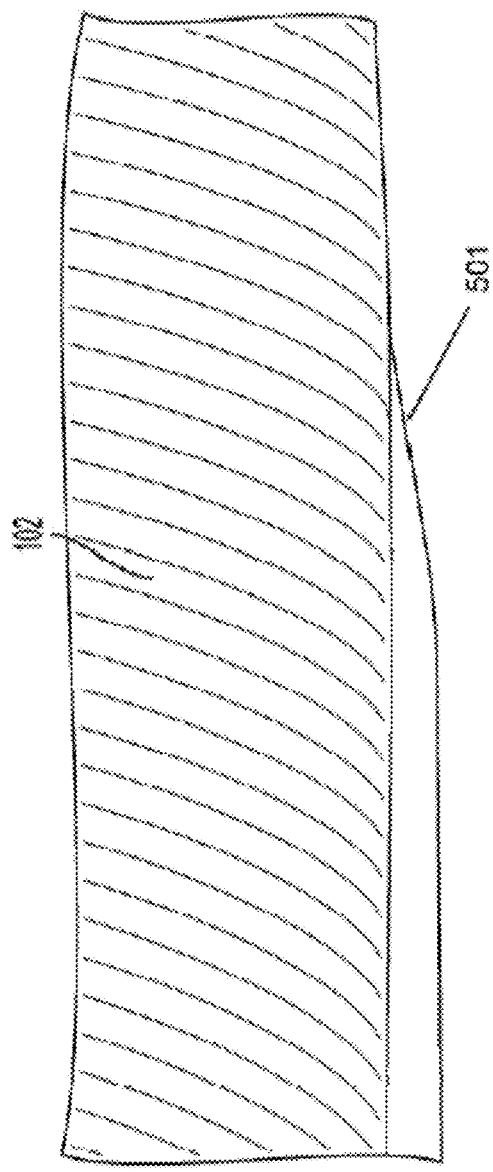
FIG. 9 depicts another perspective view of a portion of a bottom of the vessel of FIG. 7.
Figure 10:
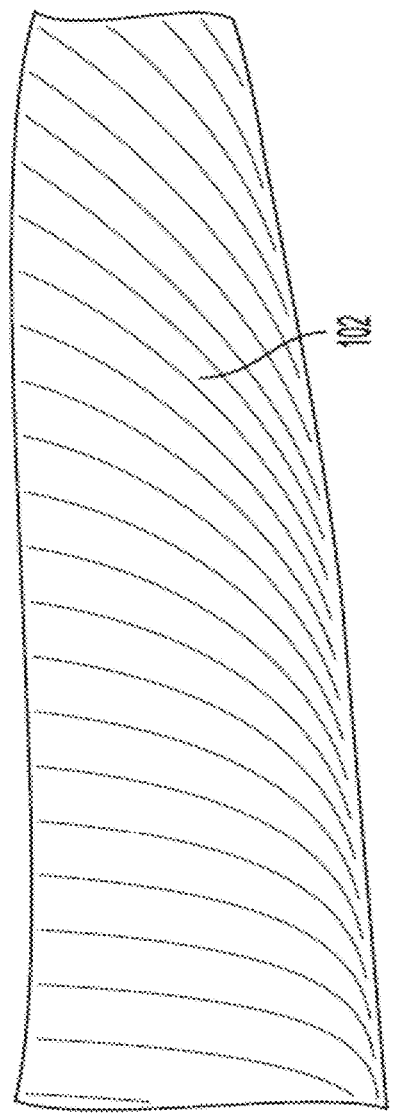
FIG. 10 depicts a bottom perspective view of the vessel of FIG. 7.
Figure 11:
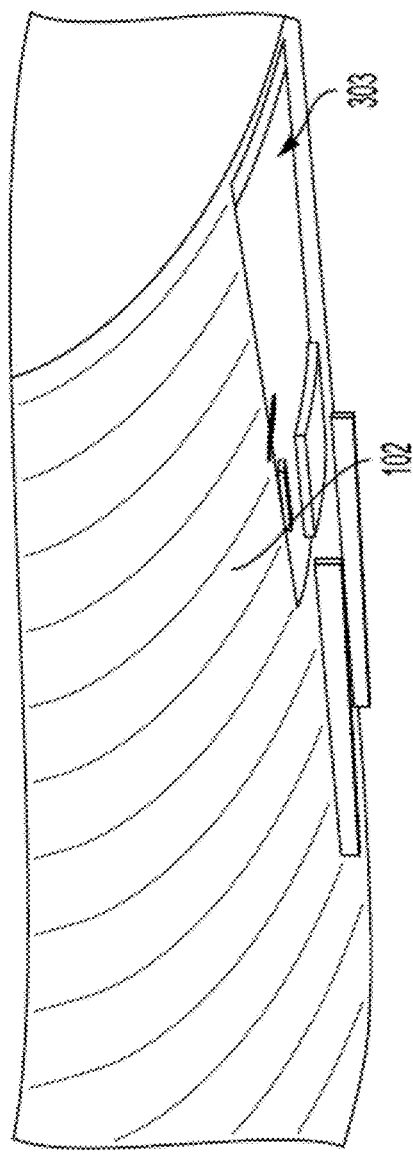
FIG. 11 depicts a bottom perspective view of a portion of the bottom of the vessel of FIG. 7.
Figure 12:
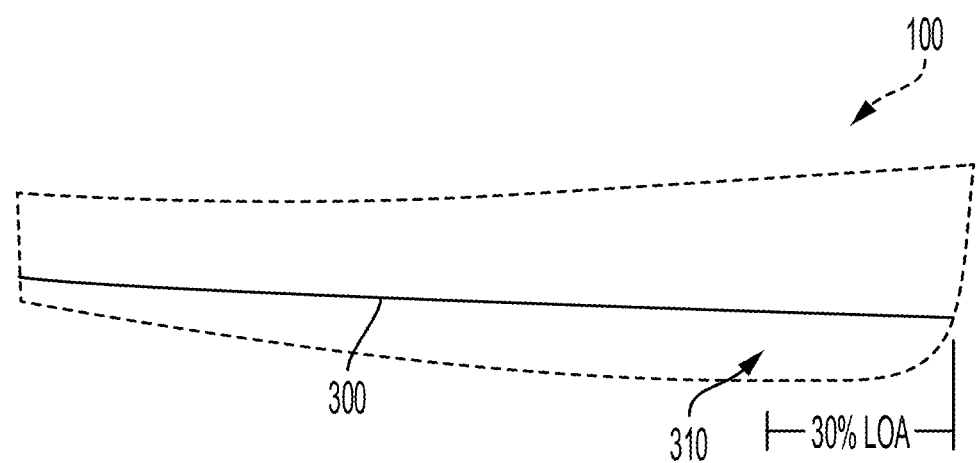
FIG. 12 is a side graphical symbolic view of a vessel showing features of the present invention.

As depicted in FIGS. 8-9, hull 102 may have a hull length of 40 feet to match a length of a waterline. A keel 500 may extend 15 feet from a front end 450 of hull 102 with FIG. 8 showing a first 10 feet of keel 500 and FIG. 9 showing a second ten feet of hull 102 including 5 feet of keel 500. Beyond 15 feet from front end 450, hull 102 does not include a keel as depicted in the third ten feet depicted in FIG. 10 and final ten feet of hull 102 depicted in FIG. 11. A motor well (303) may also be present in this final ten feet of the length for receiving a motor to propel the hull. Referring back to the drawings, embodiments of aquatic vessel 100 may be further equipped or outfitted with a roof or canopy 103. Embodiments of the roof or canopy 103 may be raised above the deck of the vessel's 100 hull 102 by connecting one or more canopy supports 105 to the hull 102. The number of canopy supports 105 may vary depending upon the length, width and shape of the canopy 103. In some embodiments, the canopy may be supported by a matrix of supports 105 described the general formula "l×w" wherein "l" is the number of rows of supports 102 positioned along length of the hull from bow to stern and "w" may be the number columns of supports 105 aligned across the width of the hull, measured from a first side of the hull 102 to an opposite side wall of the hull. For example, in the exemplary embodiment, canopy 103 may be supported by a matrix of six canopy supports 105, wherein the matrix has an 1×w of 3×2. In an alternative embodiment, canopy 103 may have an increased or decreased matrix of supports. In some embodiments support 105 matrix may have a matrices of supports connected to the hull in formations of the general formula 1×w ranging from 1 or w being equal to 2-20 or more support 105. For example, the arrangement of canopy supports may include the matrices 2×2, 3×3, 2×4, 3×2, 4×4, 4×3, 3×4, 5×2, 5×3, 6×2, etc.

Figure 4A:
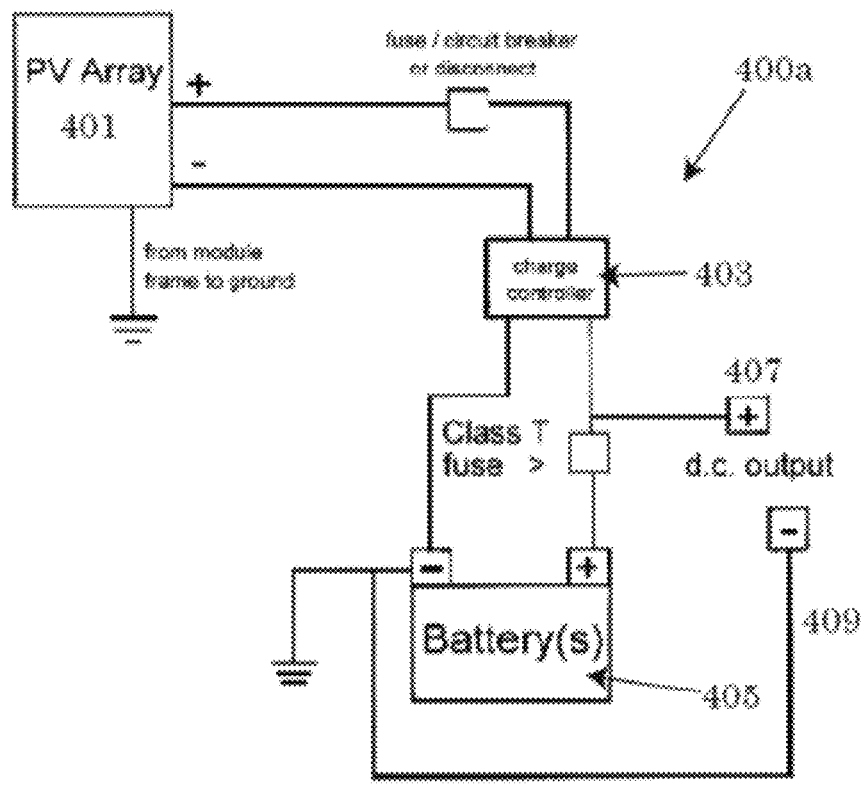
FIG. 4a depicts a schematic view of an embodiment of a photovoltaic system.
Figure 4B:
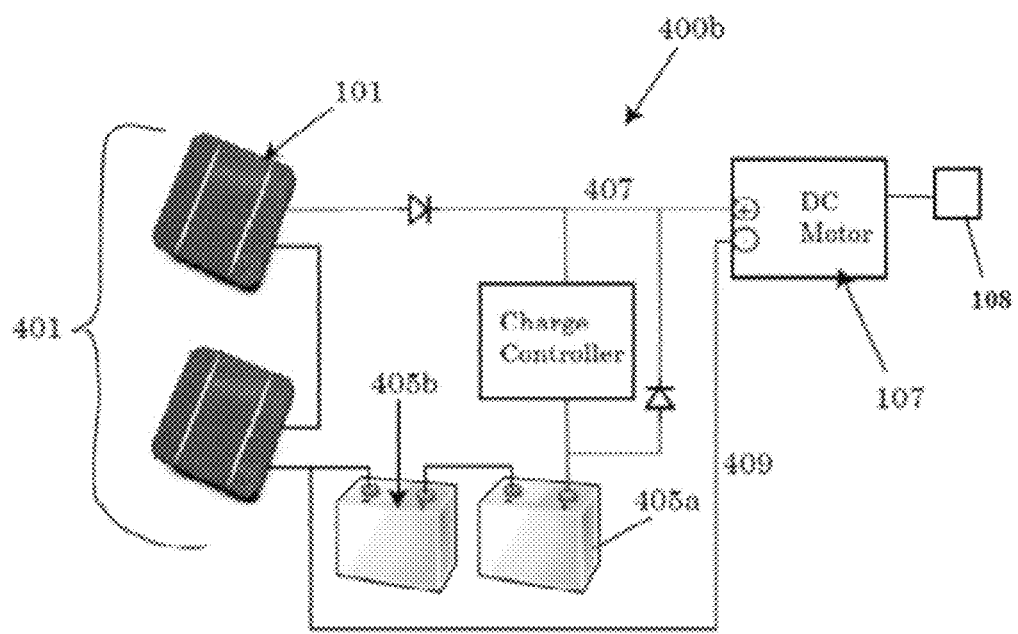
FIG. 4b depicts a schematic view of an alternative embodiment of a photovoltaic system.
Figure 5:
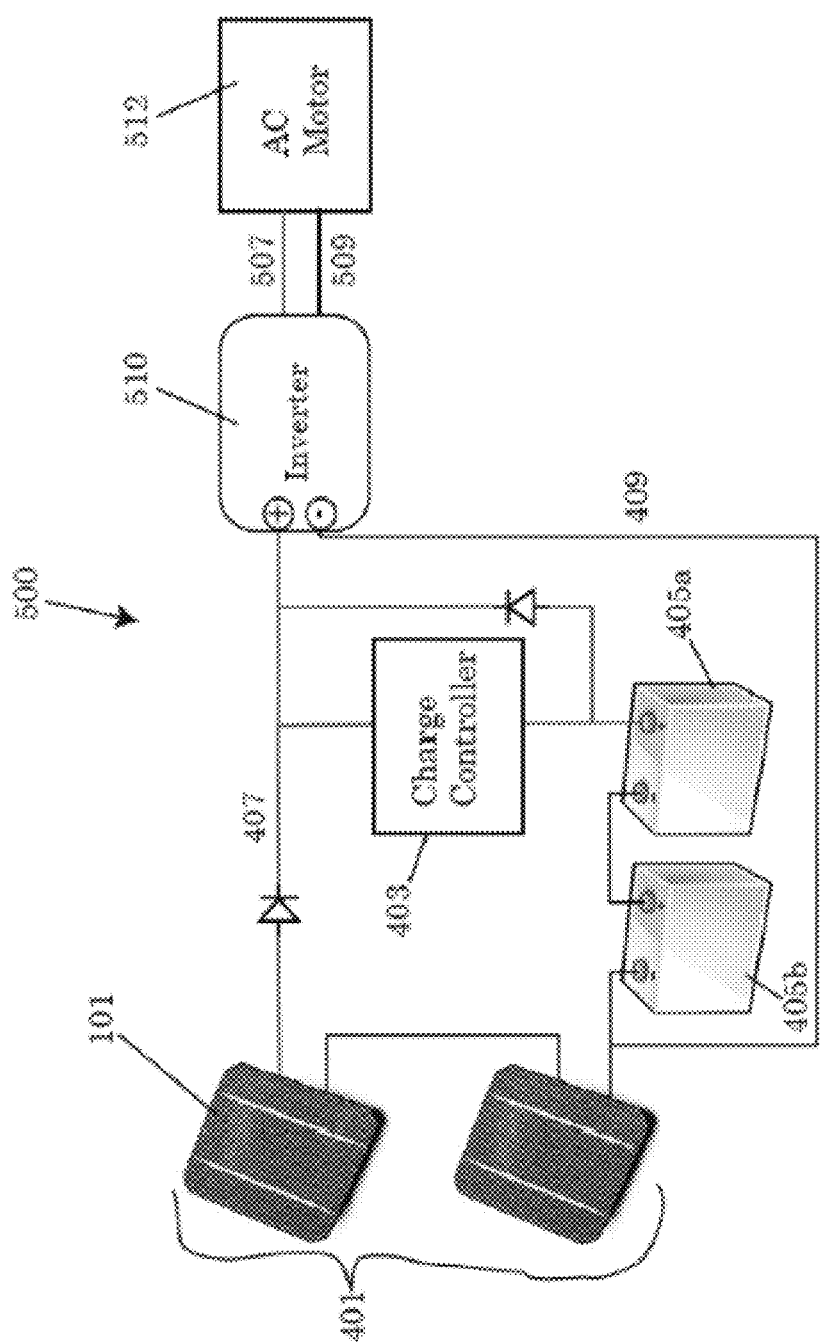
FIG. 5 depicts a schematic view of another alternative embodiment of a photovoltaic system.

Embodiments of the solar powered vessel 100 may also be equipped with a photovoltaic system 400a, 400b, 500, as shown in FIGS. 4a-5. The photovoltaic system 400a, 400b, 500 attached to the vessel 100 may be used to provide the electrical energy necessary to propel the vessel 100 through the water. Embodiments of the photovoltaic system 400a, 400b, 500 may operate to produce electricity by first collecting the energy using one or more solar panels which may also be referred to as a photovoltaic panel 101. Embodiments of the photovoltaic panel 101 may be placed on a flat or open area that will receive direct sunlight. In some embodiments, the canopy 103 may be outfitted to hold at least one photovoltaic panel 101 positioned upon the canopy of the vessel. The number of photovoltaic panels may vary depending on the energy needs of the vessel 100, the size of the vessel, the size of canopy 103 holding the photovoltaic panels, the size of the panels themselves, or the weight that canopy 103 can support, which may be dependent upon the number of supports 105 erected to withstand the weight placed on top of the canopy. In an exemplary embodiment 100, a plurality of photovoltaic panels 101 may be positioned upon the top surface of canopy 103. When more than one photovoltaic panels are connected to the same photovoltaic system 400a, 400b, 500, the photovoltaic panels may be referred to as a photovoltaic array 401.

Figure 7:
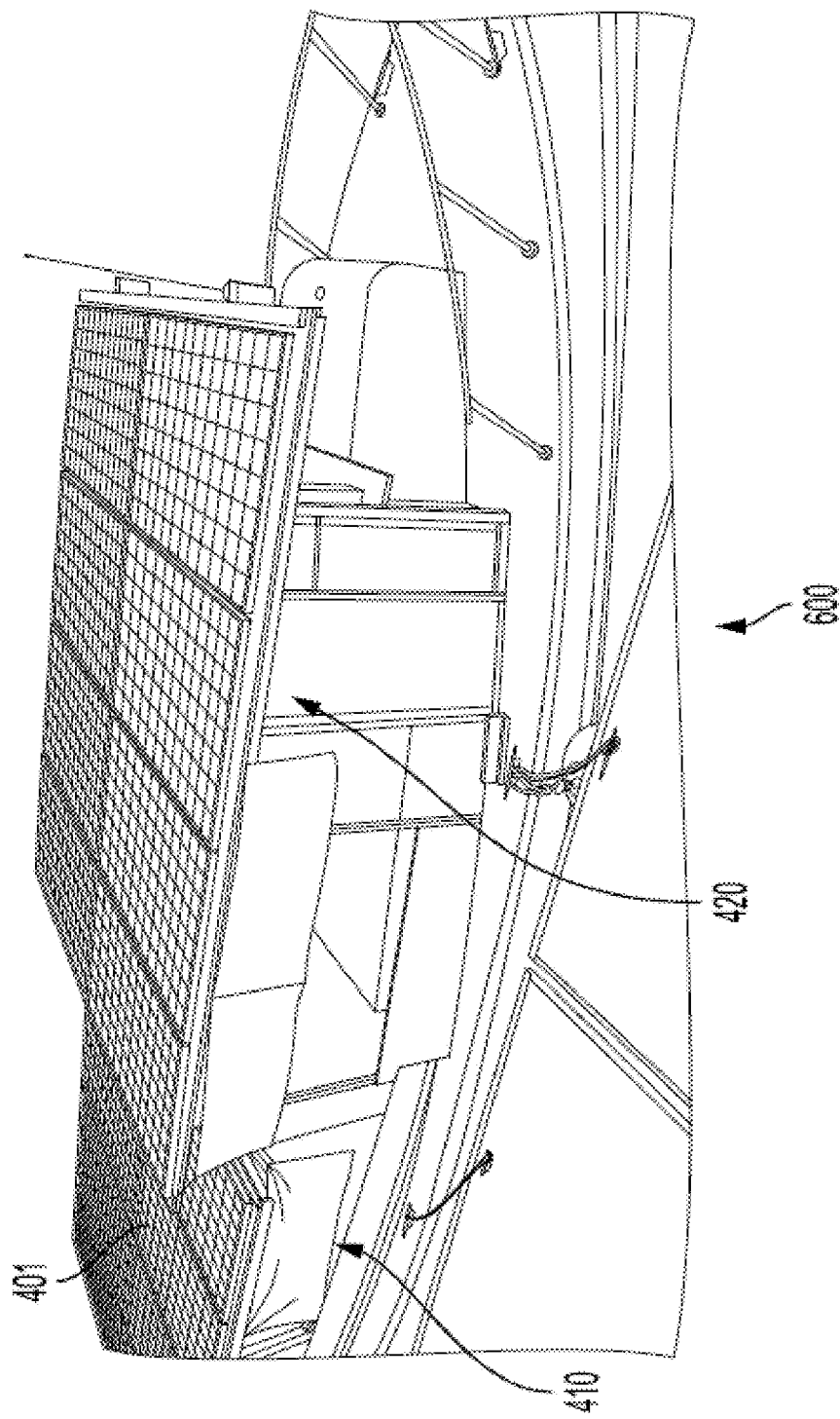
FIG. 7 is a perspective view of a vessel in accordance with the present invention which includes a cargo area and photovoltaic panels at two elevations.

Canopy 103 supporting plurality of photovoltaic panels 101 may be formed of various sizes to accommodate a desired amount of plurality of photovoltaic panels 101 to accommodate an amount of electrical power needed and/or a desired amount of shade/protection for passengers and/or cargo. The canopy may be angled at a desired angle to improve an efficiency rate of photovoltaic panels mounted thereon. In another example a mounting arrangement may allow an adjustability of an angle that the panels are oriented relative to the sun. The Canopy may be of multiple levels to accommodate passengers and/or cargo. As depicted for example in FIG. 1 a canopy may largely be located for the comfort of passengers (and could be angled to facilitate entry of passengers under the canopy) while in FIG. 7 a rear portion 410 of a boat 600 may include a cargo hold having a plurality of photovoltaic panels 401 acting as a cover and/or lid for the hold while a front portion 420 acts as a canopy for passengers. The panels in rear portion 410 may be mounted such that they may be tilted (e.g., on a hinge), raised, or slid out of the way to allow cargo to be loaded into such a cargo hold or area.

The setup of the photovoltaic system 400a, 400b, 500 may vary from embodiment to embodiment based on the energy needs to propel the boat and whether the motor and other components installed on the vessel are DC or AC powered electrical components. In the exemplary embodiment, the amount of energy received by the sun may be calculated to match or exceed the overall electrical energy necessary to propel the vessel 100. Because the energy requirements needed to propel the vessel 100 are less than the amount of energy outputted to motor 107 and other electrical components connected to the photovoltaic system, there is a buildup of energy rather than a depletion of energy stores. Accordingly, as long as the panels 101 continue to absorb and output more electrical energy than is consumed, or at the very least produce an output of electrical energy equal to the vessel's requirements, the vessel can continue to propel through the water without any additional energy supply such as a fuel source or spare batteries.

Referring to the drawings, embodiments of the photovoltaic system 400a, 400b, 500 may include one or more solar panels 101. The solar panels may be individually wired, each to a separate photovoltaic system, or the solar panels 101 may be operating collectively as a photovoltaic array 401. In some embodiments, the collecting capabilities of the panel may vary between depending upon the power rating of the panels 101. Embodiments of each panel 101 may be rated for example between approximately 50-600 watts. In an exemplary embodiment, each highly efficient solar panel 101 installed on the vessel may be rated at approximately 327 W each.

The total amount of power generated by an array 401 of solar panels 101 may be calculated as the summation of power generated by each of the panels. In one embodiment, a 25 ft vessel 100 may be equipped with a solar panel array that may be rated between approximately 1000-2500 watts. In exemplary embodiment that is 25 ft long, a 1200-1300 watt array may be installed and sufficient to propel the vessel and meet or exceed the vessel's energy requirements. In an alternative embodiment, such as a vessel that is 40 ft long, the larger vessel may have increased power demands. Likewise, in the 40 ft embodiment, the solar array 101 may be rated between 2500-6000 watts or more. In the exemplary embodiment that is 40 ft long, the vessel may utilize a solar array 401 rated for approximately 5200 watts.

Embodiments of the photovoltaic system 400a, 400b, 500 may further include components such as a charging controller 403, and one or more batteries 405. The connections made between the array 401 and each of the components may be made by wiring each of the components together. In an exemplary embodiment, the wiring may be a large gauge copper wiring. Large gauge copper wiring may efficiently transport the collected energy to the charging controller 403, batteries 405 and ultimately the motor 107 by preventing reduction in voltage drops and energy loss due to dissipation that may occur between the site of collection and the site of energy output. The wiring used may vary between 0000 gauge and 40 gauge wire. In some embodiments, the wiring may be between 0000-10 gauge wire, while in other embodiments, the wire may be between 10-20 gauge. In alternative embodiments, smaller wire may be utilized, including 20-40 gauge wires.

In some embodiments, the positive output 407 and negative output 409 of the array 401, produced as direct current (DC), may be directed to the charging controller 403 via the wires. The charging controller 403 may be used to limit the electric current that is added to or drawn from the one or more batteries 405. The charging controller 403 may prevent overcharging the batteries or the controller 403 may protect against oversupplying a voltage to the batteries, thus maximizing the performance and lifespan of each battery 405. The controller 403 may also prevent any mechanisms drawing power from the photovoltaic system, such as motor 107, from overdrawing or completely draining the batteries 405.

Due to the high efficiency of some of the embodiments disclosed, some batteries may be charged faster than the rate at which the motor or other components consume the collected energy. In these embodiments, the controller may act as a low voltage disconnect to prevent overcharging the batteries. Instead of charging the battery, the energy may be shunted to the motor, preventing additional energy from being stored in one or more full batteries. Instead, the energy collected may be sent directly to power the mechanism consuming the energy such as the motor 107. In the exemplary embodiment, the charging controller 403 may be a Morning Star Corporation, Tristar MPPT controller. The Tristar MPPT may offer maximum powerpoint tracking (MPPT) which may allow for the maximum possible amount of power from one or more of the photovoltaic panels 101 in the array 401. A charging controller utilizing MPPT technology may regulate the electrical loads being received from the panels 101, stored in the batteries 405 or outputted to the motor 107 by sampling the output of the panels 101 and automatically applying a proper resistance to obtain the maximum power from the array 401.

In some embodiments of the photovoltaic system 400a, 400b, 500, the energy collected may be stored in a single battery 405 as shown in FIG. 4a or the system may have a battery bank comprised of a plurality of batteries 405a, 405b wired together. Battery banks 405a, 405b may be constructed of more or more batteries wired in series and/or in parallel to connect each battery. In some embodiments, the batteries may be between 2-48 volts. For example, the batteries may be 2, 4, 6, 12, 24 or 48 volt batteries. In an exemplary embodiment, one or more 25.9V TORQEEDO 26-104 lithium batteries may be used for constructing the battery bank 405. Alternative embodiments may utilize other suitable types of batteries including a marine deep cycle battery, a flooded type battery, such as a lead acid battery, a sealed gel battery, an absorbed glass mat battery or a combination of batteries thereof.

The size of the battery banks 405a, 405b and the amount of energy needed to be supplied may also vary. Embodiments of the solar powered aquatic vessel may include battery banks ranging from approximately 1 kWh to approximately 20 kWh or more. For instance, embodiments having smaller energy requirements may include battery banks that may be 2 kWh, 4 kWh, 5 kWh, 7 kWh or 10 kWh. In embodiments that may have more demanding energy requirements, larger batteries or a greater number of batteries may be installed, including battery banks that may supply 12 kWh, 13 kWh, 14 kWh, 15 kWh, 16 kWh, 17 kWh 18 kWh, 19 kWh or 20 kWh or more.

Figure 6:
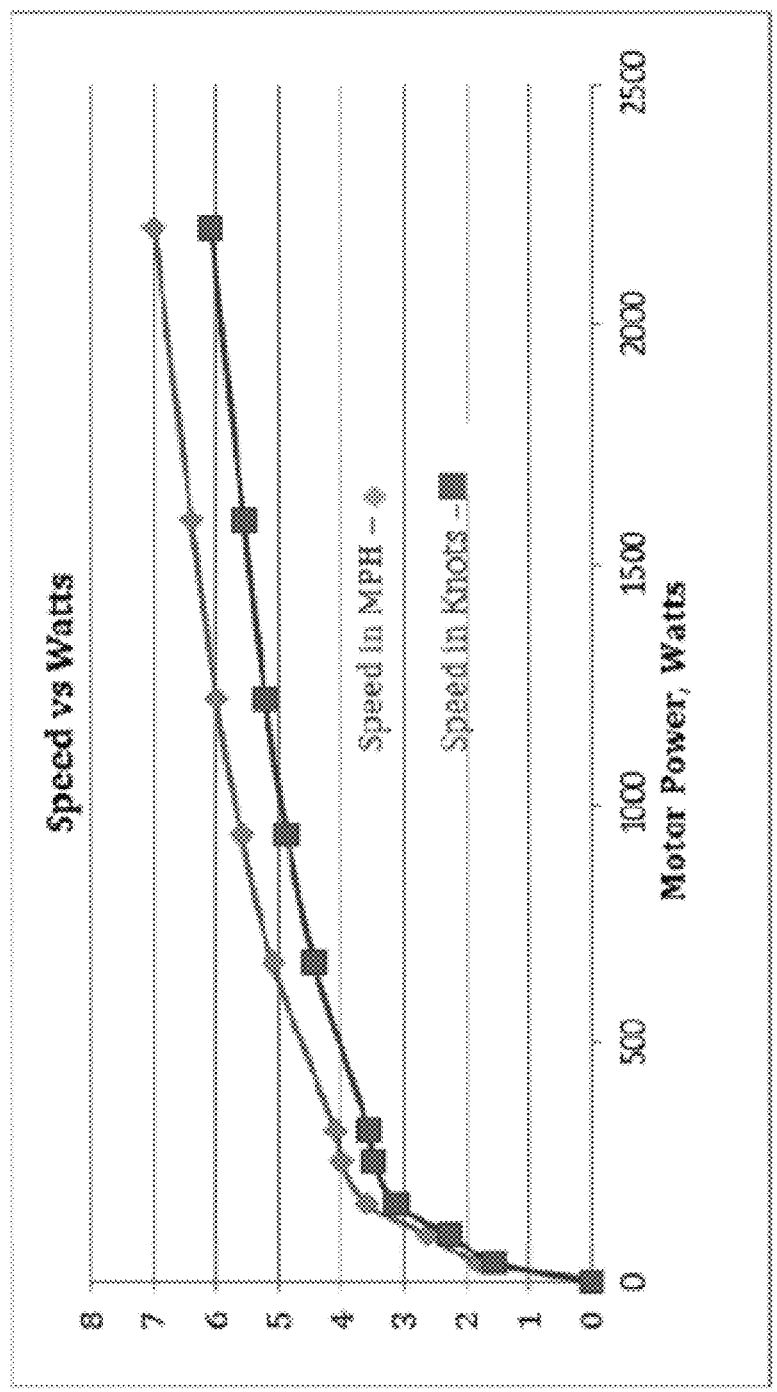
FIG. 6 graphically depicts the relationship between the output power of the motor and the speed of the embodiments of the solar powered aquatic vessel, in both miles per hour (MPH) and in Knots.

Embodiments of the vessel 100 having a photovoltaic system 400a, 400b, 500 may further include one or more engines, motors or electrical components for propelling the vessel 100 connected to, or drawing power from, the energy collected by the photovoltaic system 400a, 400b, 500. Referring to the drawings, FIG. 4b depicts a schematic view of a photovoltaic system 400b connected to a DC motor 107 that may be used to power the vessel 100. Photovoltaic panels may produce DC current which may be directly sent to the DC motor 107 from either the photovoltaic panel itself, or from the stored power collected in the battery bank 405a, 405b. The size, output and energy requirements of the motor 107 may vary from embodiment to embodiment depending on the size of the motor, its energy requirements and the size of the vessel being propelled. Referring to FIG. 6, the power of the motor 107 may range from approximately 20 watts to 2500 watts or more in some embodiments. For example, in an embodiment of the vessel that is 25 ft in length, the motor may be approximately 2000 watts (2 kW). However, in other embodiments, the motor may be a 50 watt, 100 watt, 200 watt, 300 watt, 400 watt, 500 watt, 1000 watt, 1200 watt, 1500 watt, 2000 watt, 2200 watt or 2500 watt motor. In alternative embodiments, such as a 40 ft vessel, the power requirements may increase significantly to between 3000-10000 watts or more. For instance, in an exemplary embodiment, a 40 ft vessel may have a motor 107 that is approximately 8000 watts. In other embodiments, the motor 107 may be rated for 3000 watts, 5000 watts, 6000 watts, 7000 watts, 7500 watts, 8500 watts, 9000 watts or 10,000 watts.

In another example of a photovoltaic system, similar to that of photovoltaic system 400a, 400b, 500, two or more independent systems may be utilized to power a boat (e.g., boat 100). In particular, a photovoltaic array may be electrically coupled to a battery or energy storage system along with a motor (e.g., motor 107) while a second photovoltaic system may be coupled to a second motor (e.g., motor 107) a second battery, and a second motor. In this manner, the one or more such systems may be independent and redundant relative to each and may also provide independent data for testing purposes.

Referring back to FIG. 6, the size of the motor and the efficiencies of the hull shape may impact the overall hull speed and cruising speed of the vessel 100. The graph of FIG. 6 demonstrates the relationship of the increasing energy requirements of the motor and the hull speed of the vessel for the exemplary embodiment. For instance, the hull speed of a 25 ft vessel having 2000 watt motor may be approximately 6 knots and a cruise speed (i.e., most efficient speed), which is typically 1-2 knots slower than hull speed, may be approximately 4-5 knots. In the alternative embodiment of the solar powered vessel that is 40 ft in length, that may be equipped with an 8000 watt motor, may have a cruising speed of approximately 7 knots and a hull speed of approximately 8 knots. An efficient cruising speed may one half a hull speed, for example.

In an exemplary embodiment, a three phase motor, having a highly efficient geometry, low speed propeller and efficient planetary gear reduction may be used such as TORQEEDO 2.0 motor or the TORQEEDO 4.0 motor. The efficiency of the motor 107 and the planetary gear reduction may be further enhanced in its efficiency in some embodiments by further providing an efficient cooling mechanism. For example, in some embodiments, the vessel 100 may further include an underwater fairing across motor well 303 of hull 102. This underwater fairing may assist in cooling the motor 107 by allowing the motor and gear reduction to remain underwater, while the motor pylon may not be submersed. The fairing extends the smooth shape of the underwater hull across the bottom of the motor well thus reducing turbulence and drag as the boat moves through the water. A skeg(s) may also be present in front (i.e., toward a front end of hull 102 relative to) of the motor(s) extending into well 303 such that the skegs protect a propeller(s) of the motor(s) and help the boat move in a straight track.

In some embodiments, it may be desirable for the motor and the component mechanisms controlling the vessel 100 to be supplied AC current instead of the DC current produced by the photovoltaic panels. Embodiments of a photovoltaic system 500 that may be designed for powering an AC motor 512 or other AC based components receiving power from the system 500, may further include an inverter 510. Inverter 510 may convert positive 407 and negative 409 voltages of the generated DC current into positive 507 and negative 509 voltages of AC current. Once converted, the AC current may be directed via wires to an AC motor 512 or other components that run on AC power.

In one example, a vessel as described above could have a 25 foot length, 7 foot beam, 1.3 KW solar panel array, one 2 KW motor, a 7.5 kWh battery, 3 ton max cargo, and a hull speed of 7 mph. In another example, a vessel as described above could have a 40 foot length, 11 foot beam, 5.2 KW solar panel array, two 4 KW motors, a 30 kWh battery, 12 ton max cargo, and a hull speed of 8 mph. For example, a vessel having the latter characteristics could average 41 miles per day on a relatively calm water body (e.g., NYS Erie Canal system) at 2.3 miles per KwH or 30 miles per day at 2.9 kwH based on weather conditions (e.g., sun exposure), a load carried by the vessel, and operation by the user(s).

Embodiments of methods for powering the solar powered aquatic vessel may be performed by constructing an efficient hull design and combining the efficiently constructed hull 102 with a photovoltaic system to power the motor attached to the vessel's hull. Steps for powering the solar powered aquatic vessel may comprise the steps of providing a hull having an overall length L that may be equal to a length of the vessel's waterline. In some embodiments, the method steps may further comprise providing a hull having a maximum hull draft at a station that is located at a position that is approximately 30% of the overall length of the hull, such as station 3 in the exemplary embodiment. Moreover, in embodiments of the method may further include providing a hull, wherein the bottom of the hull, at an aft position of station 5 has an approximately linear slope to a transom forming a stern of the hull.

Embodiments of the method for powering a solar powered vessel may further include providing canopy 103 and attaching the canopy to the hull. The step of attaching the canopy to the hull may be performed by constructing a series of canopy supports and connecting the canopy roof to the supports using nails, screws, clips, staples, welds or any other fasteners or methods known for attaching structures together.

Embodiments of the method for powering the vessel may also include the step of providing a photovoltaic system. The photovoltaic system may include at least one photovoltaic panel. Embodiments of the method may include the step of attaching, fastening, binding or securing the at least one photovoltaic panel to the top surface of the canopy and positioning the photovoltaic panel at an angle calculated to receive the most efficient amount of solar energy.

Embodiments of the method my also include the step of wiring together the components of the photovoltaic system and wiring the system to the at least one motor which may engage in propelling the vessel. The step of wiring the components of the photovoltaic system may include wiring together the at least one photovoltaic panel 101 to the charging controller 403 and the at least one battery 405 or battery bank 405*a*, 405*b*. Moreover, the method for powering the solar powered aquatic vessel 100 may further comprise the steps of attaching the positive and negative leads 407, 409 to the leads of the motor 107. Embodiments of the method may further include a step of engaging the photovoltaic system, wherein the photovoltaic system commences generating electrical power using the sun and its solar energy to produce electrical power that is equal to or greater than the amount of electrical power necessary for the motor to propel the solar powered aquatic vessel.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:
1. A solar powered aquatic vessel comprising:
a displacement hull having a V-shaped bow for cutting through water efficiently below a hull speed;
said displacement hull having an overall length about equal to a length of a waterline when the solar powered aquatic vessel is afloat and on an even keel;
a maximum hull draft at a station of said displacement hull that is located at about 30% of an overall length from the V-shaped bow to a stern of said displacement hull;
said hull comprising a chine having a V-shape at a bottom of nearly vertical, slowly tapering inward side panels of said displacement hull; a keel projecting downwardly away from a remainder of said bottom from said V-shaped bow toward said stern only to a distance less than half said overall length, said keel angled upwardly at an end thereof opposite the V-shaped bow;
said displacement hull comprising a single hull having a bottommost surface extending from a first port side of the solar powered aquatic vessel to an opposite starboard side of the solar powered aquatic vessel, said displacement hull having a variable draft and a variable hull shape along a length thereof;
said displacement hull having a flattened bottom portion at about a maximum beam length;
said flattened bottom portion having a more flattened shape than a shape of said displacement hull extending from the maximum beam length toward said V-shaped bow;
said bottom having an approximately linear slope from said maximum beam length to a transom forming said stern of said displacement hull;
said transom comprising a bottom portion positioned at or near the waterline when the displacement hull sits in the water;
a canopy connected to said displacement hull of the solar powered aquatic vessel, said canopy supporting at least one photovoltaic panel connected to a photovoltaic system positioned in said displacement hull, the photovoltaic system generating electrical power from a sun that is equal to or greater than an electrical power necessary to propel the solar powered aquatic vessel below the hull speed; and
a motor operatively connected to said photovoltaic system, said motor connected to a propeller to cause movement of said displacement hull at a first speed below the hull speed;
the at least one photovoltaic panel comprising a sufficient number of photovoltaic panels such that said photovoltaic system provides electrical power to said motor to cause the movement of the displacement hull below the hull speed;
a charging controller configured to direct the electrical power exceeding an amount of the electrical power needed to cause the movement of the displacement hull at the first speed to a battery to store the electrical power.

2. The solar powered aquatic vessel of claim 1 wherein said solar powered aquatic, vessel is a launch boat.

3. The solar powered aquatic vessel of claim 1 wherein said solar powered aquatic vessel has a 25 foot length, a 7 foot beam, a 1.3 KW solar panel array, a 2 KW motor, a 7.5 kWh battery, a 3 ton maximum cargo, and a hull speed of about 7 mph.

4. The solar powered aquatic vessel of claim 1 wherein said solar powered aquatic vessel has a 40 foot length, an 11 foot beam, a 5.2 KW solar panel array, two 4 KW motors, a 30 kWh battery, a 12 ton maximum cargo, and a hull speed of about 8 mph.

5. The solar powered aquatic vessel of claim 1 wherein said keel ends longitudinally prior to said linear slope of said bottom.

6. The solar powered aquatic vessel of claim 1 wherein the charging controller is configured to prevent overcharging the battery by providing a voltage disconnect to shunt the electrical power to the motor.

7. The solar powered aquatic vessel of claim 1 wherein the displacement hull is formed of wood and epoxy.

8. The solar powered aquatic vessel of claim 1 wherein the charging controller is configured to direct electrical power from the battery to the motor to cause movement of the displacement hull at the first speed below the hull speed of the displacement hull of the solar powered aquatic vessel.

9. A method for powering a solar powered aquatic vessel comprising the steps of:
providing a displacement hull having a V-shaped bow for cutting through water efficiently below a hull speed and an overall length about equal to a length of a waterline when the solar powered aquatic vessel is afloat and on an even keel,
the displacement hull having a maximum hull draft at a station of the displacement hull that is located at about 30% of an overall length from said V-shaped bow to a stern of the displacement hull;
the hull comprising a chine having a V-shape at a bottom of nearly vertical, slowly tapering inward side panels of the displacement hull;
the displacement hull having a keel projecting downwardly away from a remainder of said bottom on the displacement hull from the V-shaped bow toward the stern only to a distance less than half the overall length, the keel angled upwardly at an end thereof opposite the V-shaped bow;
the displacement hull comprising a single hull having a bottommost surface of the displacement hull extending from a first port side of the solar powered aquatic vessel to an opposite starboard side of the solar powered aquatic vessel, the displacement hull having a variable draft and a variable hull shape along a length thereof;
the displacement hull having a flattened bottom portion at about a maximum beam length;
the flattened bottom portion having a more flattened shape than a shape of the displacement extending from the maximum beam length toward the bow;
the bottom having an approximately linear slope from the maximum beam length to a transom forming a stern of the displacement hull;
the transom comprising a bottom portion positioned at or near the waterline when the displacement hull sits in the water;
connecting a canopy to the displacement hull supporting at least one photovoltaic panel
connected to a photovoltaic system positioned in the displacement hull, the photovoltaic system generating electrical power from a sun that is equal to or greater than an amount of the electrical power necessary to propel the solar powered aquatic vessel;
attaching a motor operatively connected to the photovoltaic system to the displacement hull;
generating the electrical power by the photovoltaic system from the sun that is equal to or greater than the electrical power necessary for the motor to propel the solar powered aquatic vessel;
providing the electrical power to the motor and operating the motor to cause movement of said displacement hull at a first speed below a hull speed of the displacement hull of the solar powered aquatic vessel to efficiently power the solar powered aquatic vessel; and
directing electrical power from the photovoltaic system by a charging controller to a battery when the photovoltaic system generates more electrical power than required to drive the solar powered aquatic vessel at the first speed below the hull speed.

10. The method of claim 9 wherein the operating the motor comprises operating the motor having a propeller in a motor well formed in a bottom of the displacement hull and receiving a propeller of the motor, the well being forward of the transom and behind the keel.

11. The method of claim 9 further comprising the charging controller preventing overcharging of the battery by providing a voltage disconnect to shunt the electrical power to the motor.

12. The method of claim 9 wherein said solar powered aquatic vessel has a 25 foot length, a 7 foot beam, a 1.3 KW solar panel array, a 2 KW motor, a 7.5 kWh battery, a 3 ton maximum cargo, and a hull speed of about 7 mph.

13. The method of claim 9 wherein said solar powered aquatic vessel has a 40 foot length, an 11 foot beam, a 5.2 KW solar panel array, two 4 KW motors, a 30 kWh battery, a 12 ton maximum cargo, and a hull speed of about 8 mph.

14. The method of claim 9 wherein the solar powered aquatic vessel is a launch boat.

15. The method of claim 9 further comprising the charging controller directing electrical power from the battery to the motor to cause movement of the displacement hull at the first speed below the hull speed of the displacement hull of the solar powered aquatic vessel.

16. A solar powered aquatic vessel comprising:
a displacement hull having a V-shaped bow;
said displacement hull having an overall length about equal to a length of a waterline when the solar powered aquatic vessel is afloat and on an even keel;
a maximum hull draft at a station of said displacement hull that is located at about 30% of an overall length from the V-shaped bow to a stern of said displacement hull;
said hull comprising a chine having a V-shape at a bottom of inward side panels of said displacement hull;
a keel projecting downwardly away from a remainder of said bottom from said V-shaped bow toward said stern only to a distance less than half said overall length;
said displacement hull comprising a single hull having a bottommost surface extending from a first port side of the solar powered aquatic vessel to an opposite starboard side of the solar powered aquatic vessel, said displacement hull having a variable draft and a variable hull shape along a length thereof;
said displacement hull having a flattened bottom portion at about a maximum beam length;

said flattened bottom portion having a more flattened shape than a shape of said displacement hull extending from the maximum beam length toward said V-shaped bow;

said bottom having an approximately linear slope from said maximum beam length to a transom forming said stern of said displacement hull;

said transom comprising a bottom portion positioned at or near the waterline when the displacement hull sits in the water;

at least one photovoltaic panel connected to a photovoltaic system, the photovoltaic system generating electrical power from a sun that is equal to or greater than an electrical power necessary to propel the solar powered aquatic vessel below a hull speed; and a motor operatively connected to said photovoltaic system, said motor configured to cause movement of said displacement hull at a first speed below the hull speed;

the at least one photovoltaic panel comprising a sufficient number of photovoltaic panels such that said photovoltaic system provides electrical power to said motor to cause the movement of the displacement hull below the hull speed;

a charging controller configured to direct the electrical power exceeding an amount of the electrical power needed to cause the movement of the displacement hull at the first speed to a battery to store the electrical power.

17. The solar powered aquatic vessel of claim 16 wherein said keel is angled upwardly at an end thereof opposite the V-shaped bow.

18. The solar powered aquatic vessel of claim 16 further comprising a canopy connected to said displacement hull of the solar powered aquatic vessel, said canopy supporting said at least one photovoltaic panel.

* * * * *